UNITED STATES PATENT OFFICE.

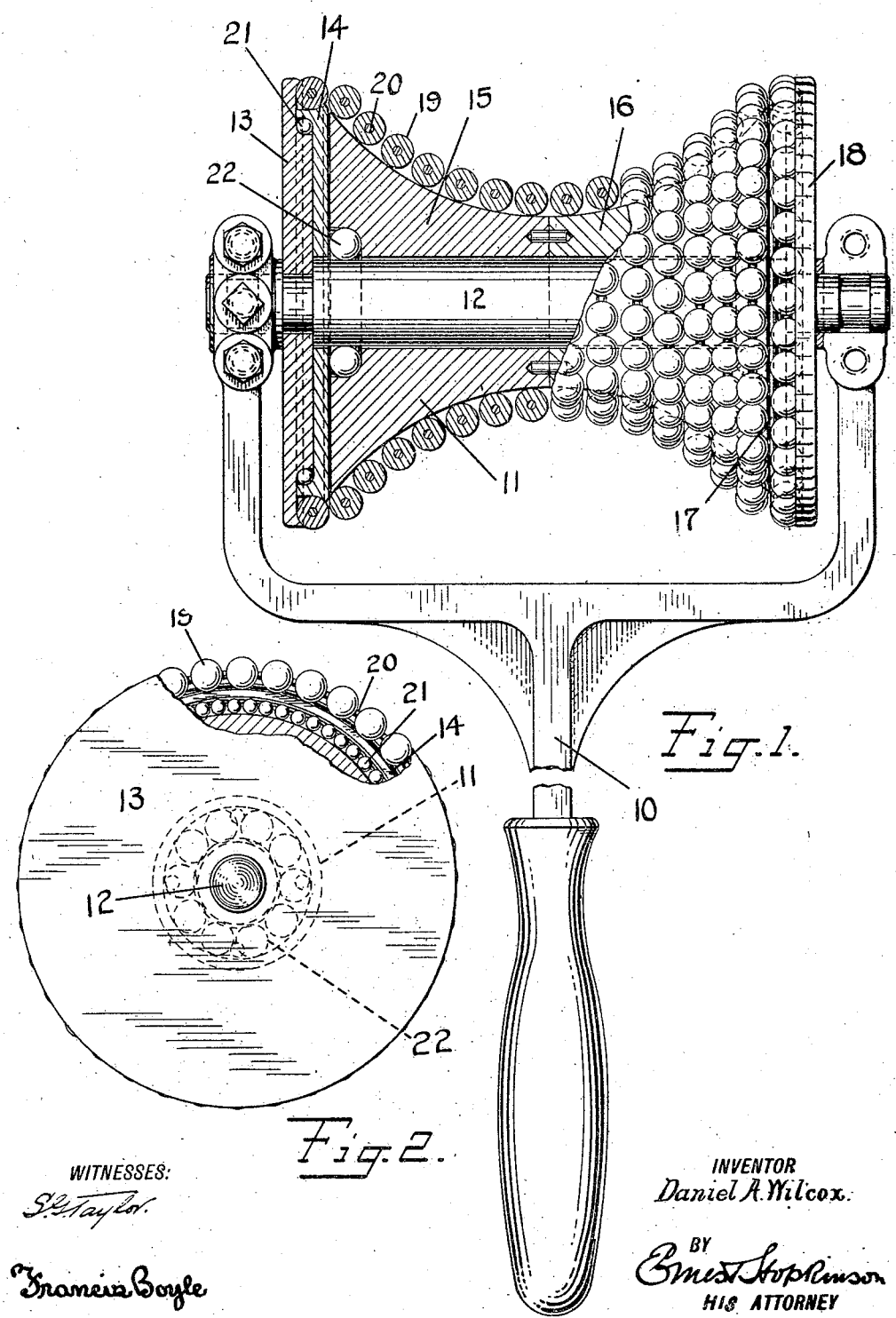

DANIEL A. WILCOX, OF GARDEN CITY NEW YORK, ASSIGNOR TO MORGAN & WRIGHT, A CORPORATION OF MICHIGAN.

TIRE-BUILDER'S TOOL.

1,162,425.  Specification of Letters Patent.  Patented Nov. 30, 1915.

Application filed March 22, 1915. Serial No. 16,238.

*To all whom it may concern:*

Be it known that I, DANIEL A. WILCOX, a citizen of the United States, and a resident of Garden City, county of Nassau, State of New York, have invented certain new and useful Improvements in Tire-Builders' Tools, of which the following is a full, clear, and exact description.

This invention relates to tools for tire builders, more particularly to tools of that class known as stitchers and employed in conforming fabric to the configuration of a ring core in building a tire.

An object of the present invention is to provide a stitcher having a working face curved to conform to the configuration of the tire and provided with anti-friction balls for contact with the tire, whereby as the tool is moved thereover the balls rotate freely upon a great surface of the tire, and thus hasten the stitching operation while most effectively performing the same without stretching or distorting the fabric.

With the above and other objects in view the invention consists of certain novel details of construction and combinations of parts hereinafter fully described and claimed, it being understood that various modifications may be resorted to without departing from the scope or sacrificing any of the advantages of the invention.

The invention will be readily understood from the following description taken in connection with the accompanying drawing, in which:

Figure 1 is a longitudinal sectional view through the tool with parts in elevation; Fig. 2 is an elevation of the bit partly in section.

Referring now to the drawing in which like characters of reference designate similar parts, the tool is shown to comprise a support 10 which may be of any desired shape and may be mounted or not as desired on any apparatus, and a bit 11, the latter being in the nature of a concave faced spool mounted on an axle 12, secured at the ends in a fork of the support 10.

The spool is preferably formed of a number of parts as shown at 13, 14, 15, 16, 17 and 18 to facilitate assembly and disassembly. The spool as such turns freely on the axle 12. The concave face of the spool forms a ball race for anti-friction balls 19 threaded upon respective wire rings 20, each of the rings being rotatable freely about the axis of the spool, and the anti-friction balls being individually turnable upon their respective rings as axes.

To further promote free turning of the various parts of the spool relatively to each other, the parts 13 and 14 are separated by ball bearings 21, and the parts 14 and 15 together with the axle 12 are separated from each other by ball bearings 22, this construction being, of course, duplicated on the opposite side of the spool shown in elevation in Fig. 1 and including the parts 16, 17 and 18.

It will thus be seen that the spool 11 may turn as a unit on the axle 12, or the various sections of the spool may turn freely relatively to each other; while the various annular series of anti-friction balls on their respective wire rings may turn as a unit in the ball race provided by the concave face of the spool, or may turn independently of and relatively with respect to each other; while also the individual anti-friction balls of each wire ring may turn relatively to each other upon the wire ring as an axis. Thus the greatest range of movement of the various parts to adapt the bit to the various needs of the tire during the stitching operation is assured.

In operation when the tool is moved over the tire, each anti-friction ball generates a corresponding line upon the tire at all points on which the fabric is pressed in close contact with the next underlying layer of fabric, the balls and various parts of the bit or spool rotating freely as above described, whereby they exert no stretching or distorting effect upon the fabric.

Since the ring core upon which the tire is built is power driven during the stitching down of the fabric the above described lines generated by the balls of the tool will merge into a continuous surface as the tool is moved transversely of the tire during the latter's rotation past the tool, whereby the layers of fabric are closely united throughout in minimum time and pressed without distortion to closely conform to the configuration of the ring core.

What is claimed is:

1. A tire builder's tool embodying a support, a bit secured thereto having a periphery curved to conform to the curvature of a tire, and forming a ball race, and anti-friction balls in said ball race for contact with the tire.

2. A tire builder's tool embodying a support, a bit secured thereto comprising a concave faced spool for contact with the surface of a tire, and a plurality of series of anti-friction balls arranged concentric with the axis of the spool and rotating upon the concave face of the spool as a ball race.

3. A tire builder's tool embodying a support, a bit secured thereto comprising a concave faced spool formed of a plurality of sections rotatably mounted with respect to each other, and a plurality of annular series of anti-friction balls beaded upon respective wire rings encircling the concave face of the spool, said rings being rotatable with respect to each other and the individual balls of each ring being rotatable with respect to each other.

Signed at New York, county of New York and State of New York, this 13 day of March, 1915.

DANIEL A. WILCOX.